H. Knowles,
Saw.
N° 7,603.   Patented Aug. 27, 1850.
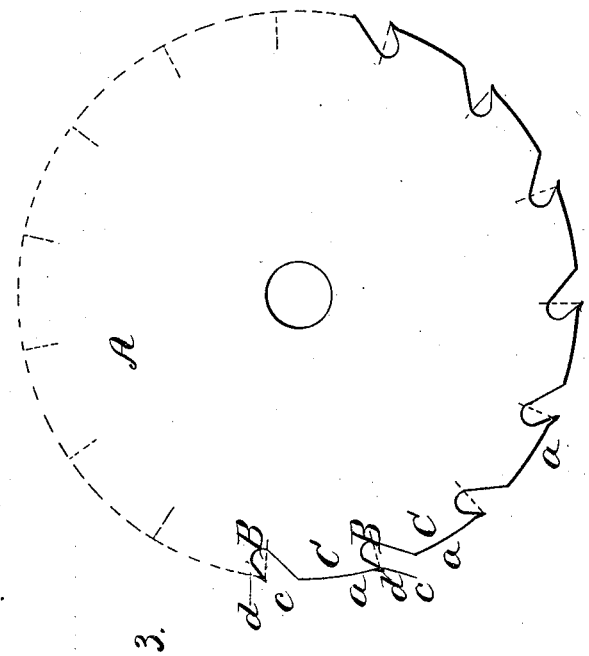
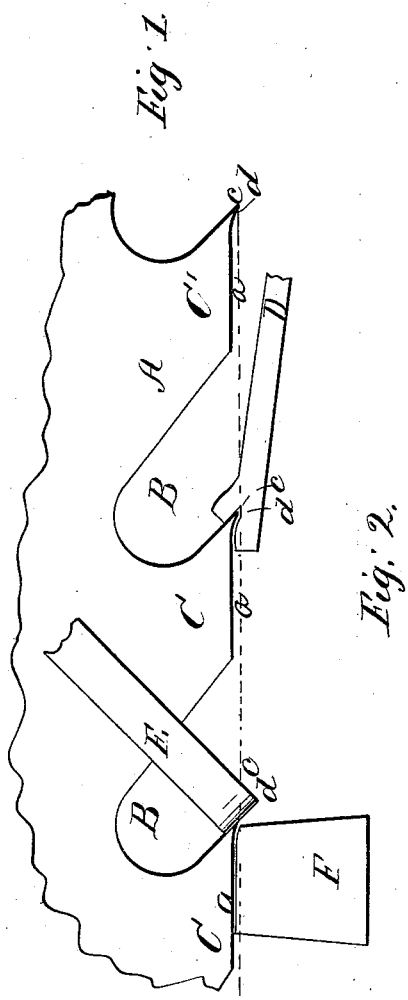
Fig. 1.
Fig. 2.
Fig. 3.

UNITED STATES PATENT OFFICE.

HAZARD KNOWLES, OF WASHINGTON, DISTRICT OF COLUMBIA.

SAW.

Specification of Letters Patent No. 7,603, dated August 27, 1850.

*To all whom it may concern:*

Be it known that I, HAZARD KNOWLES, of the city and county of Washington, in the District of Columbia, have invented a certain new and useful Improvement in Saw-Teeth; and I do hereby declare that the following is a full and exact description thereof, reference being had to the accompanying drawings, making a part of this specification.

The nature of my invention consists in the improvement in saw teeth substantially as represented in the drawings and hereinafter set forth, viz; the cutting edges of the teeth projecting forward with an outward inclination from plane or curved surfaces (separated by notches) a distance equal to the thickness of chip that each tooth is intended to remove; which plane or curved surfaces of the teeth, should be on a line—straight or curved—with each other, and parallel or nearly so with an imaginary line drawn over and touching the cutting edges of the teeth.

In the accompanying drawings Figure 1 is a side view, and Fig. 2 an edge view of a fragment of a mill saw, which has my improved form of teeth; and Fig. 3 is a side view of a circular saw having my improved form of teeth.

Similar letters indicate like parts in all the figures.

In the edge of the saw plate A, notches B, B, are formed in any well known or usual manner; C, C, are the saw teeth between the notches formed in the saw plate. The outer edges or faces $a$, of the whole series of teeth are in the same right line in the reciprocating saw, and in the same circle in circular saws. The cutting edges $c$, $c$, of the teeth are usually formed by upsetting and inclining outward the acute angles at the forward ends of their outer edges or faces $a$, $a$.

My improved saw teeth may be set in the usual manner for the purpose of clearing themselves; but I prefer to allow the teeth to remain in the same plane with the saw plate, and to spread out their cutting edges on each side, a sufficient distance to form a suitable width of kerf for the saw plate to freely play in.

After upsetting and throwing outward the cutting points of the saw teeth, it is advisable to remove from the front of their extremities—by means of a file or stone—a sufficient amount to bring the cutting edges all on to the same right line in straight saws, and to the same circular line in circular saws; and also a sufficient amount to give firmness and strength to the outline of the cutting edges of the teeth, as shown by $d$, $d$, in the drawings: I also remove in the same manner, from the sides of the extremities of the cutting edges of the teeth a sufficient amount to bring both sides of the same into planes parallel with each other, and also to give the requisite strength to the outline of the cutting edges of the teeth. The points or cutting edges $c$, $c$, of the teeth are raised above the outer edges or faces $a$, $a$, of the same, a distance equal to the thickness of the chip that each tooth is intended to remove.

The points or cutting edges of the saw teeth may be set up by means of a forked punch (D, Fig. 1,) that is driven by a hammer, which will give shape to both the inside and outside of the point, and at the same time raise them above the face $a$, of the tooth. The teeth if large and massive, as in mill-saws, can have their points or cutting edges set up with greater facility and regularity by means of an anvil F, of the form shown in Fig. 1, supported against the front face $a$, of a tooth, and a punch E, held in the position shown in the drawing, and struck with a hammer until the point is sufficiently broad and acute, and conforms to the chamfered edge of the anvil. It is obvious that the shape of the cutting edges of the teeth will correspond with the above named punch, or of the punch and anvil, and consequently they may receive the shape of chisels, gouges, or other shape best adapted to the particular kind of work they are to be applied to.

It will be perceived that each of my improved saw teeth will cut off cleanly and smoothly a portion of wood equal to the distance that its cutting edge projects from the outer face $a$, of the same; in place of the scraping action upon the wood exerted by the teeth of saws constructed in the usual manner.

In the common saw, whenever it has been attempted to give cutting edges to their teeth, by inclining the under or forward surfaces of the teeth, the teeth have usually run into the wood, anchored, and been broken off. In my improved saw teeth, the faces $a$, $a$, from the front extremities of which the acute cutting edges project—serve as guards to regulate the amount of action of the cutters, and also give strength and stiffness to the cutting edges.

What I claim as my invention and desire to secure by Letters Patent, is—

My improved saw teeth constructed and operating substantially as herein described and represented, viz, the cutting edges of the teeth inclining outward from plane or curved surfaces $a$, $a$, a distance equal to the thickness of chip that each tooth is intended to remove from the wood, and being prevented from taking a deeper hold upon the wood, at the same time that they are strengthened, by the said outer surfaces, ($a$, $a$,) in consequence of these surfaces ($a$, $a$,) being in a line with each other and parallel—or nearly so—with an imaginary right line, or circle, drawn over and touching the points of the saw teeth.

HAZARD KNOWLES.

Witnesses:
Z. C. ROBBINS,
E. L. BRUNDAGE.